United States Patent
Bonnelye et al.

[11] Patent Number: 6,093,321
[45] Date of Patent: Jul. 25, 2000

[54] PROCESS FOR REMOVING NITROGENOUS COMPOUNDS AND REMINERALIZING WATER

[75] Inventors: Véronique Bonnelye, Elancourt; Jacques Moles; Loïc Daniel, both of Rueil Malmaison, all of France

[73] Assignee: Degremont, Rueil Malmaison, France

[21] Appl. No.: 09/029,035

[22] PCT Filed: Aug. 21, 1996

[86] PCT No.: PCT/FR96/01303

§ 371 Date: May 4, 1998

§ 102(e) Date: May 4, 1998

[87] PCT Pub. No.: WO97/08105

PCT Pub. Date: Mar. 6, 1997

[30] Foreign Application Priority Data

Aug. 29, 1995 [FR] France .................................. 95 10179

[51] Int. Cl.⁷ .................................. C02F 3/30; C02F 1/58
[52] U.S. Cl. .................. 210/610; 210/616; 210/621; 210/631; 210/903
[58] Field of Search .................... 210/605, 610, 210/611, 615–617, 620, 621, 631, 903

[56] References Cited

U.S. PATENT DOCUMENTS

| | | | |
|---|---|---|---|
| 4,537,682 | 8/1985 | Wong-Chong | 210/611 |
| 5,022,993 | 6/1991 | Williamson | 210/615 |
| 5,211,847 | 5/1993 | Kanow | 210/610 |
| 5,372,720 | 12/1994 | Jönsson | 210/610 |
| 5,705,072 | 1/1998 | Haase | 210/605 |

FOREIGN PATENT DOCUMENTS

| | | |
|---|---|---|
| 0142123 | 5/1985 | European Pat. Off. . |
| 0261516 | 3/1988 | European Pat. Off. . |
| 0634369 | 1/1995 | European Pat. Off. . |

OTHER PUBLICATIONS

Patent Abstracts of Japan, vol. 011, No. 381 (C–464) Dec. 12, 1987, Patent: A 62152597.

Patent Abstracts of Japan, vol. 011, No. 381 (C–464) Dec. 12, 1987, Patent: A 62152593.

*Primary Examiner*—Thomas G. Wyse
*Attorney, Agent, or Firm*—Pollock, Vande Sande & Amernick

[57] ABSTRACT

Process for removing nitrogenous compounds, in particular nitrates, and for remineralizing water with a low mineral content, characterized in that the removal of the nitrogenous compounds and at least partial remineralization of the untreated water are carried out simultaneously by biological treatment, in the same reactor. The denitrified and remineralized water is then subjected to coagulation, flocculation and clarification treatments.

8 Claims, 1 Drawing Sheet

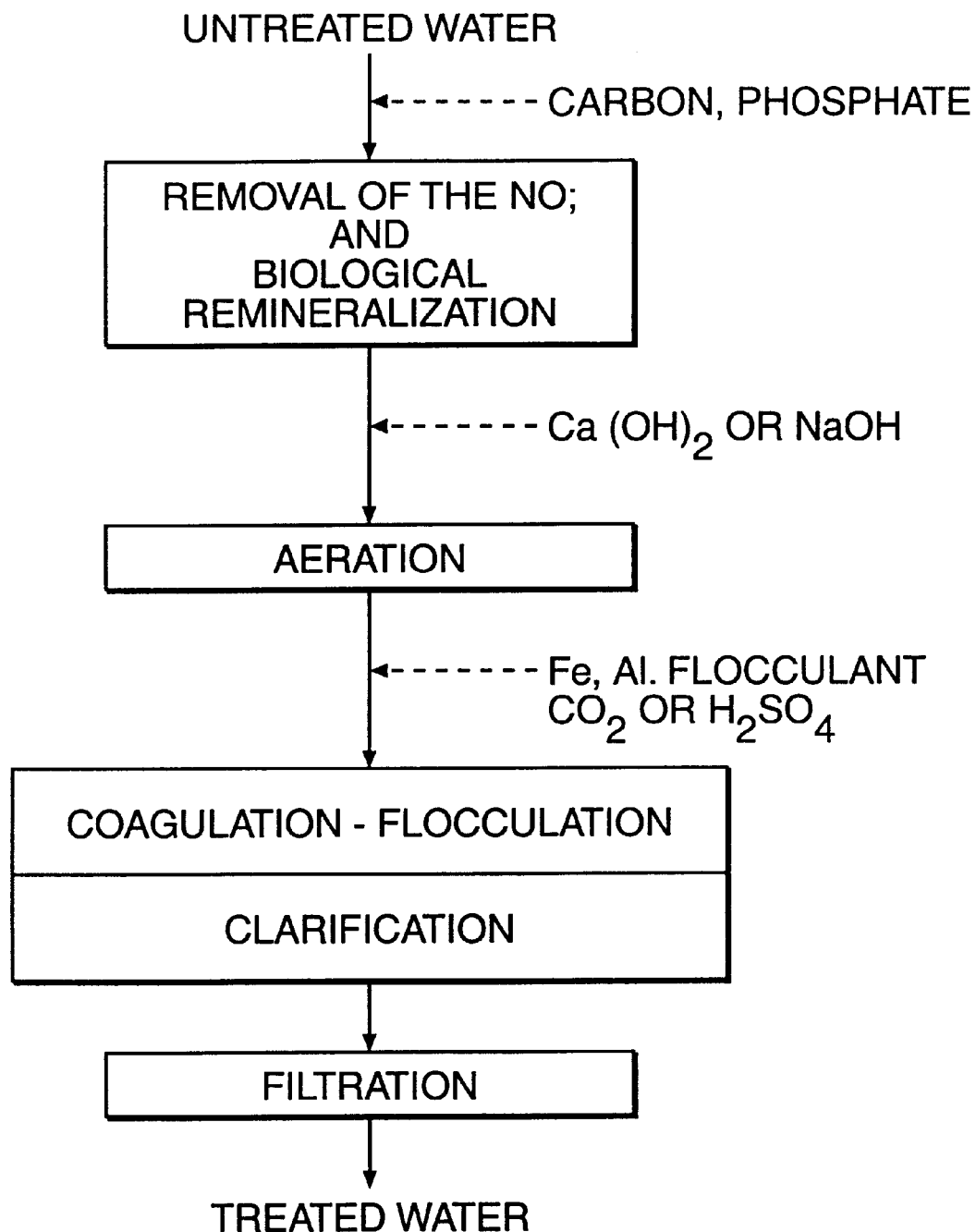

PROCESS FOR REMOVING NITROGENOUS COMPOUNDS AND REMINERALIZING WATER

FIELD OF THE INVENTION

The present invention relates to a process which makes it possible simultaneously to ensure the removal of nitrogenous compounds, in particular nitrates, and the biological remineralization of water with a low mineral content before coagulation, flocculation and clarification treatments.

BACKGROUND OF THE INVENTION

It is known that the surface waters of solid masses of granite generally have a low mineral content. In addition, agriculture contributes towards increasing the nitrogenous pollution of surface waters. The result of this is that water treatment specialists are confronted with a twofold problem:

remineralizing the water before it is distributed in the drinking water system, and removing the nitrogenous pollution in order to meet the quality standards for water intended for human consumption.

Each of these problems can be solved separately using standard treatments:

as regards the remineralization of water, this can be carried out chemically, for example by adding lime and $CO_2$;

as regards the removal of the nitrogenous pollution, physicochemical or biological processes can be used.

The physicochemical processes do not remove the nitrates, they only move them: they are found in the regeneration eluates which also contain high concentrations of chlorides, or other regeneration salts; in addition, these processes are sensitive to the presence of organic materials in the water to be treated.

The biological processes are well suited to the removal of nitrogenous compounds; however, they do not allow colloidal substances to be removed. Moreover, these processes are dependent upon the temperature of the water to be treated and they have hitherto been used industrially only for the treatment of drilling waters having a constant temperature above 10° C.

BRIEF DESCRIPTION OF THE INVENTION

Starting from this state of the art, the present invention intends to effect, under particularly economical conditions, a removal of nitrogenous compounds and at least partial remineralization of surface waters with a low mineral content before carrying out the standard coagulation, flocculation and clarification treatments.

The subject of the present invention is thus a process for removing nitrogenous compounds, in particular nitrates, and for remineralizing waters with a low mineral content, characterized in that the removal of the nitrogenous compounds and at least partial remineralization of the untreated water are carried out simultaneously by biological treatment, in the same reactor, the denitrified and remineralized water then being subjected to coagulation, flocculation and clarification treatments.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawing and description are to be regarded as illustrative in nature and not as restrictive.

BRIEF DESCRIPTION OF THE FIGURE

The FIGURE is a flowchart of the present method.

DETAILED DESCRIPTION OF THE INVENTION

According to the invention, the water to be treated, with a low mineral content, is placed in contact with a heterotrophic bacterial flora for the removal of the nitrogenous compounds, the heterotrophic biological denitrification reaction releasing carbon dioxide which is used directly and immediately to ensure at least partial biological remineralization of the water before the clarification is carried out.

An exemplary embodiment of the process which forms the subject of the invention will now be described with reference to the attached drawing. The single FIGURE in the drawing is a flowchart illustrating the various steps of this process.

The untreated water with a low mineral content, which is to be subjected to the simultaneous biological treatments for removal of the nitrogenous compounds and for remineralization, is supplemented with the necessary reagents for the growth and activity of the bacteria, i.e. a carbon source which can be assimilated by heterotrophic bacteria, in particular ethanol, acetic acid and phosphorus-containing reagents such as, in particular, phosphoric acid.

The untreated water is then introduced into a single reactor in which the removal of the nitrogenous compounds, in particular nitrates, and the partial remineralization of the untreated water are simultaneously carried out by biological means. In the reaction zone, the water to be treated, with a low mineral content, is placed in contact with a heterotrophic bacterial flora which ensures the removal of the nitrogenous compounds and the heterotrophic biological denitrification reaction releases carbon dioxide which can be used directly to participate in the remineralization reaction, before the step of coagulation-flocculation. Thus, according to the invention, the removal of the nitrogenous compounds by heterotrophic biological means is accompanied by a biological remineralization of the untreated water, with a low mineral content, in the same reaction zone.

The contact time in the biological zone is the time required for the metabolic reaction of the nitrogenous compounds and the biological remineralization. This contact time also depends on the temperature of the medium. For example, it can be pointed out that at 12° C., this contact time is about 7 minutes for a removal of 50 mg/liter of $NO_3$.

In addition, during implementation of this process, the heterotrophic denitrifying bacteria, associated with the materials in suspension in the untreated water, form a floc which has the property of causing very little clogging in a reactor with a culture bound to a support material of determined particle size, and of being able to be fluidized in a reactor with a non-bound culture.

According to the invention, the water to be treated is introduced at the base of the single biological reactor and the biological contact zone can either be filled with a granular material which allows binding of the bacteria to its surface, or can be empty, thereby making it possible, starting with a floc-generating support, to make a slurry bed composed of dense flocs fluidized by the upward flow of water during treatment.

In these two embodiments, the introduction of the water to be treated at the base of the reactor allows the evacuation of all or part of the flocs generated by the biological reaction in the presence of the materials in suspension and colloids of the water to be treated.

The specific nature of the floc formed in the biological reactor gives the slurry a higher coefficient of cohesion than that obtained with the untreated water alone, thereby making it possible subsequently to achieve better separation, either by decantation or by flotation.

After the step for removal of the nitrogenous compounds from and biological remineralization of the water, the remineralized and denitrified water is aerated, after which the steps of coagulation-flocculation and clarification of the effluent are carried out.

The coagulation-flocculation step takes place in a more buffered medium, given that the bicarbonate ions formed during the biological denitrification ensure the remineralization of the untreated water. Thus, this medium is more stable in terms of pH and the optimum coagulation conditions are easier to control, thus making it possible, for example, to reduce the residual concentration of $Al^{3+}$ ions.

Before carrying out the coagulation-flocculation treatment, the treated water in the biological reactor is supplemented with the reagents needed for the coagulation-flocculation. It receives a coagulant, generally ferric chloride, aluminium sulphate or any other derivative, an acidic or alkaline reagent which allows the optimum coagulation pH to be obtained, generally $CO_2$, sulphuric acid, sodium hydroxide or milk of lime. A flocculation adjuvant can also be used, for example a synthetic anionic polymer or one of organic origin.

The water thus denitrified, remineralized, coagulated and flocculated is then clarified by a standard process, for example by decantation or flotation.

The process according to the present invention can very easily be integrated into an already existing clarification process comprising a slurry-bed decanter or flotation equipment as clarification reactor.

The process according to the present invention allows considerable savings to be achieved in terms of remineralization reagents. Thus, on the basis of a decrease of 70 ppm of nitrates and on a plant with a throughput of 500 m³/h, the saving achieved by the invention, when compared with the amounts of $CO_2$ injected in carrying out standard processes for remineralization of water, is 250 tons per year, which, under the current economic conditions, represents a saving of 450 000 to 500 000 francs per year.

It is clearly understood that the present invention is not limited to the exemplary embodiments described and mentioned above, but can encompass all the variants.

What is claimed is:

1. A process for removing nitrogenous compounds while simultaneously remineralizing water having a low mineral content, the process comprising the steps:
   subjecting the water to heterotrophic bacterial flora for the removal of the nitrogenous compounds, resulting in a heterotrophic biological denitrification reaction releasing carbon dioxide;
   recycling the released carbon dioxide for achieving at least partial biological remineralization of the water before subsequent clarification, the biological denitrification occurring in the same reaction zone and simultaneous with the biological remineralization;
   subjecting the denitrified and remineralized water to coagulation;
   subjecting the coagulated water to flocculation; and
   subjecting the resulting water to clarification.

2. The process according to claim 1, wherein a biological treatment reaction zone is filled with a granular material which allows the heterotrophic bacteria to bind to its surface and further wherein the water to be treated is introduced at the base of the zone in order to ensure evacuation of at least a part of flocs generated by the biological reaction in the presence of the materials in suspension and colloids of the water to be treated.

3. The process according to claim 1, wherein a biological treatment reaction zone is empty and further wherein the water to be treated is introduced at the base of the zone in order to make it possible, starting with a floc-generating support, to make a slurry bed composed of dense flocs fluidized by the upward flow of the water during treatment.

4. The process according to claim 1, wherein the contact time of the water to be treated in a biological treatment reaction zone depends on the temperature of the medium and is chosen so as to ensure the reaction for metabolization of the nitrogenous compounds and biological remineralization of the untreated water.

5. The process according to claim 1, wherein additives added to the water to be treated for growth and activity of the bacteria, are chosen from carbon sources which can be assimilated by the bacteria, the sources consisting of the group ethanol, acetic acid and phosphate reagents.

6. The process according to claim 1, wherein after denitrification and remineralization, the water is supplemented with reagents needed for coagulation and flocculation, and further wherein a coagulant is chosen from the group consisting of ferric chloride and aluminum sulfate.

7. The process according to claim 1 together with the step of selectively adding an acidic or alkaline reagent in order to correct the pH of coagulant material, said reagent being chosen from the group which consists of $CO_2$, sulfuric acid, sodium hydroxide and lime white.

8. The process according to claim 5, wherein a flocculation adjuvant is added.

* * * * *